2,909,446
PROCESS OF FLAMEPROOFING CELLULOSIC AND PROTEINACEOUS MATERIALS AND RESULTING PRODUCT

Cyril Aubrey Redfarn, London, and Harold Coates, Wombourn, England, assignors to Albright & Wilson Limited, Birmingham, England, a British company No Drawing. Application May 2, 1955
Serial No. 505,506

Claims priority, application Great Britain May 1, 1954

11 Claims. (Cl. 117—138)

This invention comprises the flame-proofing and glow-proofing of fibres of a cellulosic nature or made from natural protein, by treating the fibres or the material from which they are made with an inorganic polymeric substance which has been prepared from a polymeric phosphochloronitride or more usually from a mixture of the same.

Some of these polymeric substances are particularly useful for treating textile material because they are soluble in water and may later be rendered insoluble by the application of heat. Others which are insoluble in water may still be used in the flame-proofing of paper by applying them in powder form to the pulp used in paper manufacture. In addition they may be used as finely divided powders for addition to viscose dope used in rayon manufacture, again to produce a flame-proofed rayon. Still others may be obtained in both water-soluble and insoluble form by varying the method of manufacture as is hereinafter described.

The formation of polymeric phosphochloronitrides has been described in the "Structural Chemistry of Inorganic Compounds," by W. Huckel 1951; volume II, chapter IX, part 2, section 6, gives a summary of various investigations concerning the formation of polyphosphochloronitrides $(PNCl_2)_n$ by the reaction of ammonium chloride with phosphorous pentachloride. These polymers range from liquids to rubber-like products which are water-insoluble and heat-stable up to 600° C.

They are fire resistant and the structure of the polymers is given as:

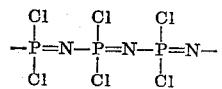

We have discovered that useful products for the purpose of this present invention may be obtained by introducing reactive groups into the polymers the general formula of which is shown above.

According to the present invention a process for flame-proofing and glow-proofing fibres composed wholly or to a substantial extent of cellulosic material or made from naturally occurring protein comprises treating the said fibres or other materials with inorganic polymeric substances formed by subjecting polymeric phosphochloronitride to hydrolysis, or hydrazination so as to substitute a reactive group for each of at least some of the chlorine atoms of the said polymeric phosphochloronitride, the said reactive groups being then reacted either directly with any remaining chlorine atoms of another of the polymer molecules or with the reactive group of another of the polymer molecules or with a cross-linking agent forming a bridge between polymer chains.

The polyphosphochloronitrides containing the said reactive groups may be self condensed or further polymerised from relatively low molecular weight compounds to higher molecular weight compounds, for example, by the action of temperatures in the neighbourhood of 100° C. to 360° C. or higher, or alternatively, they may be reacted with a crosslinking agent, e.g. formaldehyde, to provide three-dimensional products. The polymeric phosphochloronitride may be rendered reactive and be reacted, according to the invention, by partial hydrolysis with an alkali, for example by heating with an aqueous alcoholic solution of sodium hydroxide, in which case by controlling the reaction conditions and the molecular ratio of the reactants water-soluble or hydrophilic products are obtainable. In place of the hydrolysis reaction the polymeric phosphochloronitrides may be reacted with aqueous or liquid hydrazine. We have found that substituted derivatives of phosphochloronitride which are water-soluble may be incorporated into cellulosic materials such as cotton and viscose rayon, and may then be further polymerised on the fibre by the application of heat, suitably at temperatures of 100°–150° C. to give compounds which are insoluble in water. Cellulosic materials so treated are rendered flame-proof and glow-proof with stability to washing and dry cleaning. It is possible that the polymeric material combines with the cellulose by reaction of the hydroxyl groups of the cellulose with the reactive groups of the modified phosphochloronitride polymer, e.g.

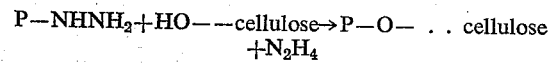

The original polymeric phosphochloronitrides may be reacted with ethylene oxide, introducing into the phosphochloronitride molecules of a beta hydroxy ethyl group. The substitution of hydroxy groups or hydroxylated radicals or the introduction of hydrazino groups in substitution for the chlorine atoms gives rise to water-soluble or hydrophilic characteristics in the polymer. This water-soluble property may be used to effect a fire-proofing of textiles or paper by condensation or reaction with a cross-linking agent. Various cross-linking agents may be used for this purpose, examples being the di-isocyanates, ethylene oxide, polyhydric compounds such as the glycols and glycerol and di-or poly-hydroxy aromatic compounds, aldehydes such as formaldehyde and glyoxal, and polymethylol compounds such as THPC (tetrakis-hydroxy methyl phosphonium chloride) and methylol melamines. It is important in carrying out the process to avoid too extensive a hydrolysis or other reaction since it has been observed that if the hydrolysis reaction is too vigorous or is carried too far, the phosphochloronitride polymer breaks down to non-polymeric substances.

It will be appreciated that whereas reference has been made hereinbefore only to the phosphochloronitrides, the same considerations will apply to other phospho-halogenonitrides. However, questions of cost make it likely that the phosphochloronitrides will be the most useful industrial raw material.

The treatment of the materials to be flame-proofed or glow-proofed according to the invention may be carried out in a variety of ways, depending among other things upon the solubility properties of the inorganic polymeric treating agent applied and the nature of the material to be treated. Thus, for instance, an aqueous solution or uniform suspension or dispersion of the agent may be used to treat the fibre, or the agent, if solid, may be ground and applied directly as a powder to the materials from which the fibres are made. Furthermore the agent may be brought onto or into the material to be treated, as such, or in a precondensed or partially polymerised state whereupon the treated materials are cured on the fibre. Alternatively, the whole of the reaction by which the agent is formed from the phosphochloronitride may take place on the fibre. It will be appreciated that reactive groups may be possessed by the fibre, enabling the latter to act as a cross-linking agent in the formation of the inorganic polymer.

The following examples are given for the purpose of illustrating the invention, all parts being by weight unless otherwise stated:

*Example 1*

Phosphochloronitride of mixed molecular complexity is prepared according to Schenck and Römer, Berichte, vol. 57B, page 1343. 50 parts by weight of an aqueous solution containing 39% of hydrazine $N_2H_4$ are added to 58 parts of phosphochloronitride and warmed until reaction commences. Much heat is evolved and a white brittle solid polymer formed.

This polymer is ground up when dry and added to viscose dope in the proportion of 1 part polymer to 10 parts of dope. The resulting rayon is satisfactorily flame-proofed.

*Example 2*

58 parts of a phosphochloronitride of mixed molecular complexity prepared as in Example 1 is gradually added in small portions to 150 parts of a well-stirred solution of hydrazine (39%) containing 1 part of Calsolene Oil HS at 100° C. The resulting precondensate syrup is diluted to 550 parts by weight with water. Samples of 8 ounce cotton twill cloth are impregnated with this solution, dried at 110° C. and baked for 15 minutes at 140° C. The cloths are washed off for 30 minutes in water at 60° C. and then dried. These cloths are flame-resistant and glow-proof, and carry a 7% increase in weight determined at a relative humidity of 60%.

*Example 3*

Filter paper (Whatman No. 1 grade), thin tissue paper and thick cartridge paper are each impregnated with the $PNCl_2$-hydrazine precondensate prepared as described in Example 2 and cured at 140° C. for 15 minutes. These papers are completely flame-proof and glow-proof with an increase in weight of 16% to 35%.

*Example 4*

A sample of 8 ounce cotton twill as used in Example 2 is padded with the $PNCl_2$-hydrazine precondensate solution prepared as described therein and then immediately padded with a 10% solution of formaldehyde. The treated cloths are dried for 5 minutes at 100–110° C., washed for five minutes in water at 60° C. and redried. The resulting cloths are flame-resistant and glow-proof with a 7% increase in weight.

*Example 5*

An oily polymer is obtained, from the phosphochloronitride of mixed molecular complexity prepared according to Schenck and Römer in Berichte, vol. 57B, page 1343, by removing crystalline cyclic bodies by extraction with petroleum ether.

1 part of the oily polymer so obtained is dissolved in 4 parts of methylene chloride and added slowly with mixing to 15 parts of 30% aqueous hydrazine. A white somewhat gelatinous precipitate is obtained. The liquor is filtered and the residue in the filter washed free from soluble chlorides with hot water and dried at 100° C. The dried residue, insoluble in water and organic solvents, is powdered and 1 part by weight mixed with 10 parts by volume of a solution of 5 parts of chlorinated rubber dissolved in 20 parts of benzene. The dope so obtained is applied to cotton cloth and dried to give flame-proofing accompanied by an increase in weight of 20%.

*Example 6*

Cotton cloth is immersed in a 30% aqueous solution of hydrazine and excess of solution is squeezed out. Then, without drying, the cloth is immersed in a solution of 1 part of the oily polymer described in Example 5 dissolved in 4 parts of methylene chloride. The cloth is then squeezed out and dried at 100° C. and washed with water until free from soluble chloride. This gives a somewhat dusty incrustation of 11% added weight which requires fixing, e.g. by immersion in a solution of 5 parts of chlorinated rubber in 20 parts of benzene.

*Example 7*

1 part of the oily polymer described in Example 5 dissolved in 4 parts of methylene chloride is applied to cotton cloth and excess solution squeezed out. Before the solvent has evaporated, the cloth is immersed in a 30% aqueous solution of hydrazine for about 10 minutes. The cloth is removed, excess solution is squeezed out, and the cloth is then washed with water until the washings are free from soluble chloride. The cloth is then dried at a temperature of up to 100° C. With an increase in cloth weight of 10% the cloth is flame-proof and afterglow-proof; even at an increase in weight of 5% a considerable degree of flame-proofing is obtained. The proofing is insoluble in water and organic solvents.

*Example 8*

Cotton cloth immersed in a solution of 1 part of the oily polymer, described in Example 5, is dissolved in 4 parts of methylene chloride. Excess solution is squeezed out and then the cloth is immersed in an ammoniacal glycerol solution containing 1 part of glycerol dissolved in 9 parts of 0.88 ammonia solution. The cloth is then dried for 10 minutes at 100° C., washed with water until free from soluble chloride and then dried again. With an increase in weight of 20% the cloth is flame-proof and afterglow-proof.

Comparable results are obtainable by using resorcinol or hydroquinone in the place of the glycerol in this Example, in similar amounts.

*Example 9*

A solution of phosphochloronitride-hydrazine precondensate prepared as described in Example 2 (200 parts) is mixed with 10 parts of a partially methylated methylolmelamine (sold under the registered trade marks "Beetle" BT.309 and "Aerotex" M3) and the resulting solution padded on to 8 ounce cotton twill. The cloth is dried at 100° C., baked for 15 minutes at 140° C. and then rinsed in water at 60° C. for 5 minutes. After again drying at 100° C. the cloth is found to be flame-resistant and glow-resistant with an increase in weight of 6%.

*Example 10*

Phosphochloronitride of mixed molecular complexity prepared as in Example 1 (22 parts) is mixed with pyridine (98 parts) and dissolved almost completely, with evolution of heat. A mixture of ethylenediamine hydrate (14.8 parts) and pyridine (19 parts) is added slowly to the phosphochloronitride solution with stirring. A vigorous reaction takes place and a brown polymer separates out. This material is filtered off, washed with cold water and dried in vacuo to give 17.5 parts of a product which is insoluble in boiling 31% formaldehyde solution and in hot dilute hydrochloric acid. This product does not melt or burn.

The product is finely ground and added to ten times its weight of pulp used for paper production. The resulting paper is flame-proofed.

It will be understood that the word "filaments" includes natural fibres, e.g. cotton fibres, and also includes filaments extruded from cellulosic or proteinaceous dope.

The invention is applicable to a wide variety of products made of cellulosic and proteinaceous fibres including yarns, textile fabrics, wood and paper.

What is claimed is:

1. The process of imparting flame-proof and glow-proof properties to materials selected from the group consisting of cellulosic and proteinaceous materials comprising treating said materials with a compound selected from the group consisting of hydroxyl-substituted polyphosphochloronitride, and hydrazino-substituted polyphosphochloronitride and effecting a linking relationship between adjacent polymer chains of said compound on said materials, a sufficient amount of said compound being used to increase the weight of said materials by at least 5%, said compound being water-insoluble after said linking relationship is effected on said materials.

2. The process defined in claim 1, wherein the linking relationship between polymer chains is effected by reacting the chlorine groups of each polyphosphochloronitride with the particular substituted reactive groups of adjoining polyphosphochloronitrides.

3. The process defined in claim 1, wherein the linking relationship between polymer chains is effected by reacting the particular substituted reactive groups of the polyphosphochloronitrides with similar groups on adjoining polyphosphochloronitrides.

4. The process defined in claim 1, wherein the linking relationship between polymer chains is effected by polymerization of the compound.

5. The material made in accordance with the process defined in claim 1.

6. The process defined in claim 1 wherein the linking relationship between polymer chains is effected by a cross-linking agent.

7. The process defined in claim 6, wherein the cross-linking agent is a member selected from the group consisting of a di-isocyanate, ethylene oxide, glycol, glycerol, polyhydroxy aromatic compound, polymethylol compound, and an aldehyde.

8. The process defined in claim 6, wherein the cross-linking agent is an aldehyde.

9. The process defined in claim 6, wherein the cross-linking agent is a polymethylol compound.

10. The process of imparting flame-proof and glow-proof properties to cellulosic material comprising treating said materials with a water-soluble compound selected from the group consisting of hydroxyl-substituted polyphosphochloronitride, and hydrazino-substituted polyphosphochloronitride, and polymerizing said compound on said material by subjecting said compound to a temperature of 100–150° C. whereby the compound on said material becomes water insoluble.

11. The process of imparting flame-proof and glow-proof properties to cellulosic materials comprising incorporating a compound selected from the group consisting of hydroxyl-substituted polyphosphochloronitride, and hydrazino-substituted polyphosphochloronitride into said cellulosic material prior to the manufacture of said material as a finished product, and effecting a linking relationship between adjacent polymer chains in the finished material on said materials, a sufficient amount of said compound being used to increase the weight of said materials by at least 5%, said compound being water-insoluble after said linking relationship is effected on said materials.

References Cited in the file of this patent
UNITED STATES PATENTS

| | | |
|---|---|---|
| 2,334,710 | Kauth | Nov. 23, 1943 |
| 2,637,704 | Hurley | May 5, 1953 |
| 2,782,133 | Vallette | Feb. 19, 1957 |

OTHER REFERENCES

Chem. Rev. 32, 109–33 (1943).

Department of Agriculture AIC–364, "Flameproofing of Cotton With THPC Resins," by Reeves et al., November 2, 1953.